United States Patent
Mizuochi

(10) Patent No.: US 11,930,269 B2
(45) Date of Patent: Mar. 12, 2024

(54) LENS APPARATUS, IMAGE PICKUP APPARATUS, CONTROL METHOD OF THE LENS APPARATUS, CONTROL METHOD OF THE IMAGE PICKUP APPARATUS, AND STORAGE MEDIUM TO NORMALIZE AND DISPLAY DEPTH OF FIELD INFORMATION

(71) Applicant: CANON KABUSHIKI KAISHA, Tokyo (JP)

(72) Inventor: Fuya Mizuochi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/522,146

(22) Filed: Nov. 9, 2021

(65) Prior Publication Data
US 2022/0159193 A1    May 19, 2022

(30) Foreign Application Priority Data
Nov. 13, 2020    (JP) .................................. 2020-189241

(51) Int. Cl.
H04N 5/335    (2011.01)
G03B 17/14    (2021.01)
H04N 23/55   (2023.01)
H04N 23/63   (2023.01)
H04N 23/663  (2023.01)

(52) U.S. Cl.
CPC ........... *H04N 23/633* (2023.01); *G03B 17/14* (2013.01); *H04N 23/55* (2023.01); *H04N 23/663* (2023.01); *G03B 2206/00* (2013.01)

(58) Field of Classification Search
CPC .................................................. G03B 2206/00
See application file for complete search history.

(56) References Cited

U.S. PATENT DOCUMENTS

2009/0047010 A1*  2/2009  Yoshida ............... H04N 5/2356 396/89
2019/0394388 A1* 12/2019  Takanashi ........ H04N 5/232125
2020/0412938 A1* 12/2020  Shibuno ........... H04N 5/232123
2021/0127052 A1*  4/2021  Tanaka ............... H04N 5/23203

FOREIGN PATENT DOCUMENTS

JP    2016045350 A  *  4/2016
JP    2016045350 A      4/2016
JP    2020038347 A      3/2020

* cited by examiner

*Primary Examiner* — Gary C Vieaux
(74) *Attorney, Agent, or Firm* — ROSSI, KIMMS & McDOWELL LLP

(57) ABSTRACT

A lens apparatus attachable to an image pickup apparatus includes an imaging optical system, and a communicator configured to communicate with the image pickup apparatus. The communicator transmits to the image pickup apparatus first information used to calculate a depth of field and second information used to normalize the depth of field into a display format of a display unit of the image pickup apparatus.

10 Claims, 8 Drawing Sheets

$$Lf = \frac{\delta F L^2}{f^2 + \delta F L} \quad \text{FRONT DEPTH OF FIELD}$$

$$Lr = \frac{\delta F L^2}{f^2 - \delta F L} \quad \text{REAR DEPTH OF FIELD}$$

$\delta$  DIAMETER OF PERMISSIBLE CIRCLE OF CONFUSION $F$  APERTURE VALUE (F-NUMBER)

$L$  OBJECT DISTANCE (DISTANCE FROM FRONT PRINCIPAL POINT POSITION TO OBJECT)

$f$  FOCAL LENGTH

LENS APPARATUS, IMAGE PICKUP APPARATUS, CONTROL METHOD OF THE LENS APPARATUS, CONTROL METHOD OF THE IMAGE PICKUP APPARATUS, AND STORAGE MEDIUM TO NORMALIZE AND DISPLAY DEPTH OF FIELD INFORMATION

BACKGROUND OF THE INVENTION

Field of the Invention

The present invention relates to a lens apparatus and an image pickup apparatus, each of which is configured to drive a focus lens during focusing.

Description of the Related Art

Image pickup apparatuses, such as digital still cameras and digital video cameras, can focus on an object by driving a focus lens. Japanese Patent Laid-Open No. ("JP") 2016-45350 discloses a display method of image-taking-distance information that displays a combination of an image taking distance calculated from a position of a focus lens and optical information of an imaging optical system, and a depth of field calculated from permissible-circle-of-confusion information.

The method disclosed in JP 2016-45350 can display the depth of field on a display unit of an interchangeable lens, but cannot display it on a display unit (such as an electronic viewfinder and a rear liquid crystal display) of a camera body. Therefore, the user needs to check the depth of field displayed on the display unit of the interchangeable lens, after viewing away from the display unit of the camera body, which reduces the operability.

SUMMARY OF THE INVENTION

The present invention provides a lens apparatus, an image pickup apparatus, a control method of the lens apparatus, a control method of the image pickup apparatus, and a storage medium, each of which is configured to display information on a depth of field on a display unit of a camera body and thereby to improve operability of a user.

A lens apparatus according to one aspect of the present invention attachable to an image pickup apparatus includes an imaging optical system, and a communicator configured to communicate with the image pickup apparatus. The communicator transmits to the image pickup apparatus first information used to calculate a depth of field and second information used to normalize the depth of field into a display format of a display unit of the image pickup apparatus.

An image pickup apparatus according to another aspect of the present invention attachable to a lens apparatus includes an image sensor, a calculator configured to calculate a depth of field based on first information transmitted from the lens apparatus and stored information stored in the image pickup apparatus, and a display unit configured to normalize the depth of field based on second information transmitted from the lens apparatus and to display information on the depth of field.

A control method corresponding to the above lens apparatus and a storage medium storing the control method of the lens apparatus, and a control method corresponding to the above image pickup apparatus and a storage medium storing the control method of the image pickup apparatus also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

Figure 1:
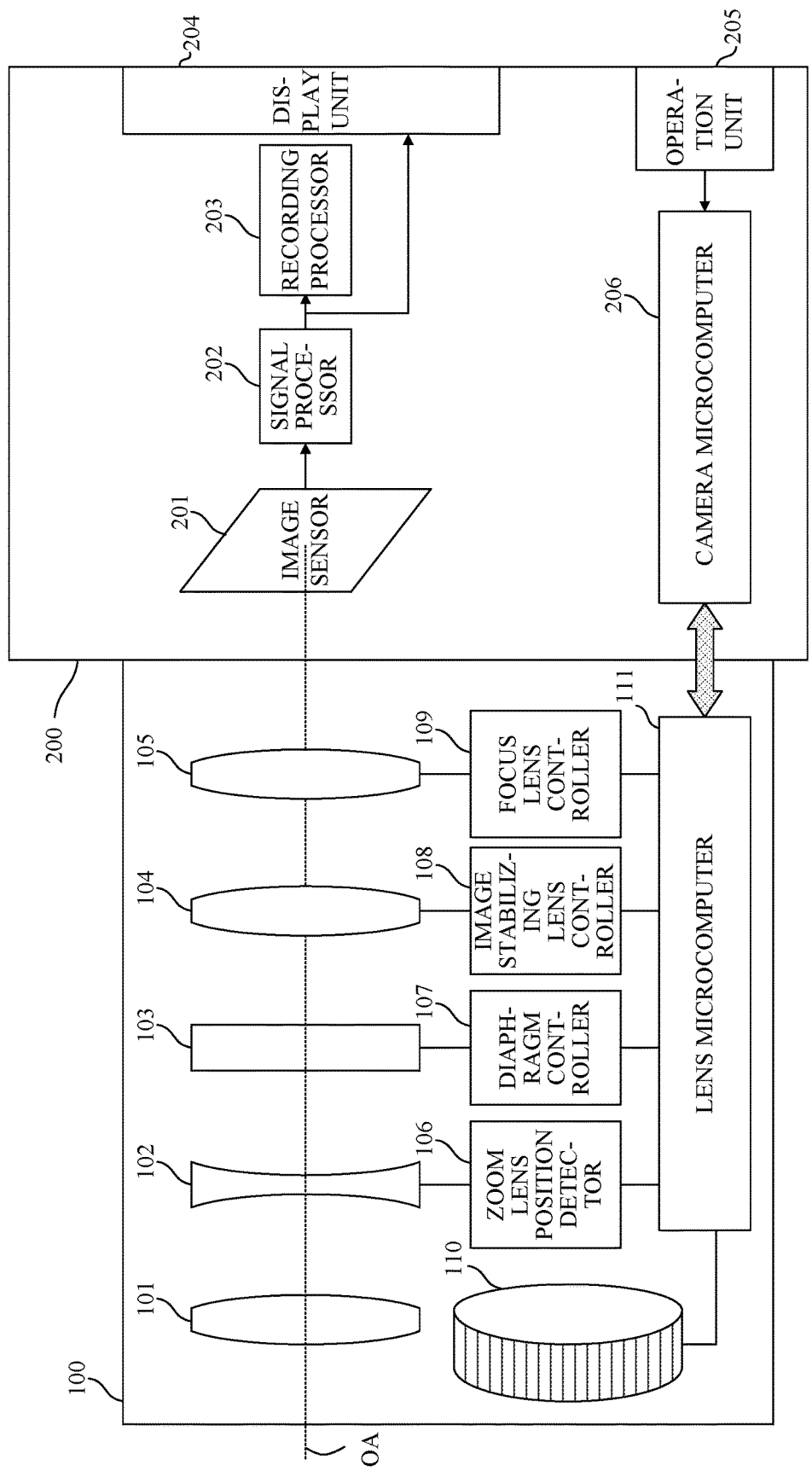
FIG. 1 is a block diagram of an image pickup apparatus according to each embodiment.

A description will now be given of a configuration of an image pickup apparatus according to each embodiment. FIG. 1 is a block diagram of an image pickup apparatus 10. The image pickup apparatus 10 includes a camera body (image pickup apparatus body) 200 and an interchangeable lens (lens apparatus) 100 attachable to the camera body 200.

The interchangeable lens 100 is mechanically and electrically connected to the camera body 200 via an unillustrated mount. The interchangeable lens 100 receives a power supply from the camera body 200 via an unillustrated power supply terminal provided on the mount. The interchangeable lens 100 operates various actuators and a lens microcomputer 111, which will be described later, using the electric power received from the camera body 200. The camera body 200 communicates with the interchangeable lens 100 via an unillustrated communication terminal provided on the mount, and controls the interchangeable lens 100 by transmitting a control command to the interchangeable lens 100.

The camera body 200 includes an image sensor 201 including a phase difference AF sensor and the like, a signal processing circuit 202, a recording processor (processing unit) 203, a display unit 204, an operation unit 205, and a camera microcomputer 206. The image sensor 201 includes a CMOS sensor or a CCD sensor, photoelectrically converts an object image (optical image) formed by an imaging optical system in the interchangeable lens 100, and outputs an electric signal (analog signal). The analog signal output from the image sensor 201 is converted into a digital signal by an unillustrated A/D conversion circuit.

The signal processing circuit 202 performs various image processing for the digital signal from the A/D conversion circuit and generates a video signal. The signal processing circuit 202 generates the contrast state of the object image from the video signal, such as focus information indicating a focus state of the imaging optical system and luminance information indicating an exposure state. The signal processing circuit 202 outputs the video signal to the display unit 204, and the display unit 204 displays the video signal as a live-view image used to confirm the composition, the focus state, and the like. The signal processing circuit 202 outputs the video signal to the recording processor 203. The recording processor 203 stores the video signal as a still image or a motion image data in an external memory or the like.

The camera microcomputer 206 as a camera controller (control unit or device) controls the camera body 200 in response to inputs from an imaging instruction switch, various setting switches, and the like included in the operation unit 205. The camera microcomputer 206 includes a (camera) communicator (communication unit or device) configured to communicate with the interchangeable lens 100. The camera microcomputer 206 transmits via the communicator to the lens microcomputer 111 control commands relating to a light amount adjusting operation of a diaphragm (aperture stop) unit 103 according to the luminance information and a focusing operation of a focus lens 105 according to focus information. As will be described later, the camera microcomputer 206 includes a calculator that calculates the depth of field based on first information transmitted from the interchangeable lens 100 and third information (stored information) stored in the camera body 200.

The interchangeable lens 100 includes the imaging optical system (101 to 105), various controllers (control units or devices) each of which controls a corresponding actuator configured to drive the imaging optical system, an operation ring 110 used to operate the focus lens 105, and the lens microcomputer 111.

The lens microcomputer 111 is a lens controller that controls the operation of each component in the interchangeable lens 100. The lens microcomputer 111 includes a (lens) communicator (communication unit or device) configured to communicate with the camera body 200, receives the control command transmitted from the camera body 200 via the communicator, and accepts a transmission request of lens data. The lens microcomputer 111 provides a lens control corresponding to the control command, and transmits the lens data corresponding to the transmission request to the camera body 200. Among various control commands, the lens microcomputer 111 outputs a command to a diaphragm controller 107 and a focus lens controller 109 in response to a command relating to the light amount adjustment and a command relating to focusing. The diaphragm controller 107 and the focus lens controller 109 drive the diaphragm unit 103 and the focus lens 105, respectively, in accordance with a command from the lens microcomputer 111. This configuration provides the light amount adjusting operation by the diaphragm unit 103 and the autofocus processing for controlling the focusing operation with the focus lens 105. The lens microcomputer 111 outputs a command to the focus lens controller 109 to drive the focus lens 105 according to an operation amount of the operation ring 110, and controls the focusing operation.

The imaging optical system includes a field lens 101, a zoom lens 102 configured to provide magnification variations, the diaphragm unit 103 configured to adjust the light amount, an image stabilizing lens 104, and a focus lens 105 configured to provide focusing. The zoom lens 102 is movable in a direction (optical axis direction) along an optical axis OA illustrated by a dotted line in FIG. 1, and is driven in the optical axis direction when the user operates a zooming unit connected to an unillustrated zoom mechanism. Thereby, the magnification variation (zooming) is performed to change the focal length of the imaging optical system by moving the zoom lens 102.

A zoom lens position detector (detection unit or device) 106 detects the zoom lens position using a position detection sensor such as a variable resistor, and outputs the position data of the zoom lens 102 to the lens microcomputer 111. The position data output from the zoom lens position detection unit 106 is used by the lens microcomputer 111 for a zoom tracking control and the like, which will be described later.

The diaphragm unit 103 includes sensors such as diaphragm blades and Hall elements. The states of the diaphragm blades are detected by the above sensor and output to the lens microcomputer 111. The diaphragm controller 107 outputs a driving signal to drive an actuator, such as a stepping motor and a voice coil motor, in accordance with the command from the lens microcomputer 111. Thereby, the light amount can be adjusted by the diaphragm unit 103.

The image stabilizing lens 104 moves in a direction orthogonal to the optical axis OA of the imaging optical system and reduces image shakes caused by camera shakes or the like. An image stabilizing lens controller 108 outputs a driving signal to drive the image stabilizing actuator in accordance with the command from the lens microcomputer 111 in response to the shake detected by an unillustrated shake sensor such as a vibration gyro. This configuration can provide image stabilization processing that controls the shift operation of the image stabilizing lens 104.

The focus lens 105 is movable in the optical axis direction, detects the position of the focus lens 105 using a position detecting sensor such as a photo-interrupter, and outputs position data to the lens microcomputer 111. The focus lens controller 109 outputs a driving signal to drive an actuator such as a stepping motor in accordance with a command from the lens microcomputer 111, and moves the focus lens 105 during focusing.

The focus lens 105 corrects the image plane fluctuation due to the magnification variation caused by the zoom lens 102. The rear focus type magnification varying optical system provides a zoom tracking control that moves the focus lens 105 to correct the image plane fluctuation that occurs when the zoom lens 102 is moved for the magnification variation, and maintains the in-focus state.

Figure 2:
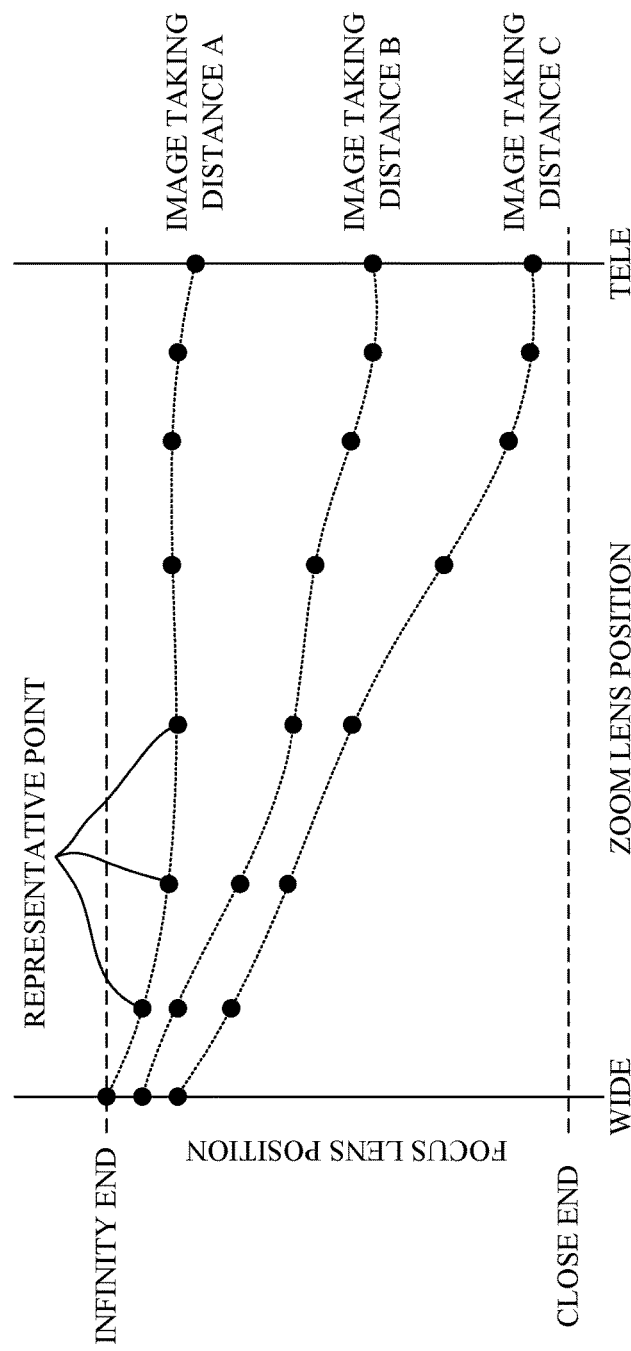
FIG. 2 illustrates electronic cam data for each image taking distance according to each embodiment.

Referring now to FIG. 2, a description will be given of the zoom tracking control. FIG. 2 illustrates electronic cam data (tracking curve) for each image taking distance (distance from the image plane to the object plane (object)). In FIG. 2, an abscissa axis represents the position of the zoom lens 102 (zoom lens position), and an ordinate axis represents the position of the focus lens 105 (focus lens position). In order to perform zoom tracking control, an unillustrated memory (internal memory) mounted on the lens microcomputer 111 stores information on electronic cam data (tracking curve). As illustrated in FIG. 2, the electronic cam data is data showing a relationship between the zoom lens position and the focus lens position set to maintain the in-focus state according to the image taking distance. The lens microcomputer 111 outputs a control command to the focus lens controller 109 based on the electronic cam data, and drives the focus lens 105 for the tracking control.

In each embodiment, the electronic cam data is created based on the focus sensitivity, which is an image plane moving amount against the unit driving amount of the focus lens 105. As illustrated in FIG. 2, the electronic cam data actually stored in the memory is data corresponding to a plurality of representative image taking distances A to C, and data indicating the focus lens position relative to a representative zoom lens position (representative point). A focus lens position corresponding to a zoom lens position other than the representative points can be calculated by calculating a ratio of distances to a plurality of representative points close to the zoom lens position and by performing the linear interpolation according to the ratio.

The image pickup apparatus 10 according to each embodiment can drive the focus lens 105 during focusing, both in the autofocus (AF) that provides automatic focusing and manual focus (MF) that provides manual focusing. In the AF, the camera microcomputer 206 calculates the in-focus position of the focus lens 105 based on the AF evaluation value corresponding to the video signal generated by the image sensor 201, and sends to the lens microcomputer 111 a control command relating to focusing via the camera communicator. The lens microcomputer 111 outputs a command to the focus lens controller 109 in response to a control command transmitted from the camera microcomputer 206, and drives the focus lens 105 to control the focusing operation. In the MF, the lens microcomputer 111 outputs a command to the focus lens controller 109 according to the operation amount of the operation ring 110, drives the focus lens 105, and controls the focusing operation.

Figure 3:
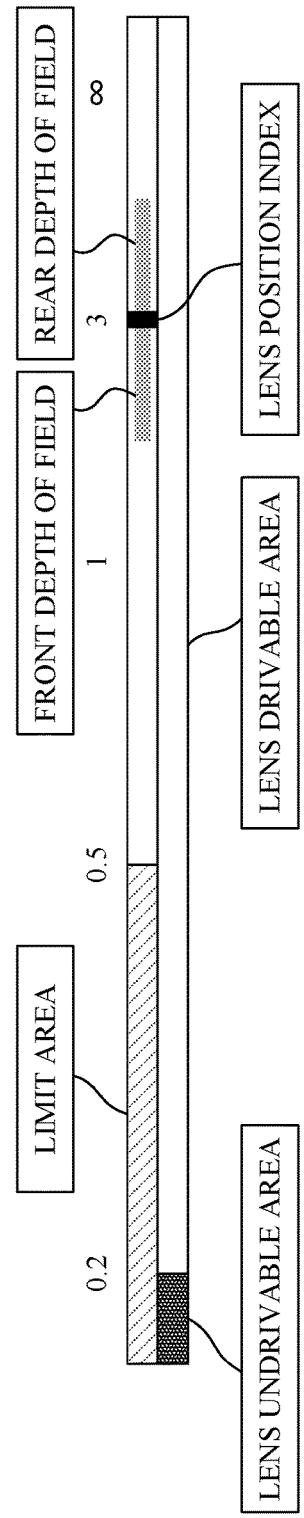
FIG. 3 illustrates a distance display bar according to each embodiment.

Referring now to FIG. 3, a description will be given of a distance index (index of distance information) according to the position of the focus lens 105 in the interchangeable lens 100, which is displayed on the display unit 204 of the camera body 200. FIG. 3 illustrates the distance index in each embodiment. As illustrated in FIG. 3, the distance index includes a lens driving area as a driving range of the focus lens 105, a distance scale indication indicating the distance, and a lens position indicating the in-focus position of the focus lens 105. The distance index includes a lens undrivable area and a lens drivable area indicating that the lens driving area changes according to the focal length and the like. They will be collectively referred to as a "distance index bar" hereinafter. In the example illustrated in FIG. 3, the focus lens 105 is drivable so as to focus on an object from about 0.2 m to infinity. A focusing area on an object closer than 0.2 m is set to an undrivable area due to settings such as zoom. The current focus lens 105 is in an in-focus position on an object of 3 m.

A limit area illustrated in FIG. 3 is an area in which the AF is unavailable. For example, limiting an image taking distance close to the image pickup apparatus 10 can provide quick focusing on a distant object. Thus, when the user previously knows the distance range of the object in advance, the user may limit the AF range through settings, and the AF unavailable area is displayed as the limit area. Alternatively, since the AF evaluation value cannot be accurately calculated due to the optical performance of the interchangeable lens 100, the AF is unavailable and the MF dedicated area that means the MF is available is shown. In the MF dedicated area, the minimum image taking distance changes according to the position of the zoom lens 102, and the image taking distance position that was the AF available area on the WIDE (wide-angle) side becomes the MF dedicated area on the TELE (telephoto) side, and the area may be switched depending on the zoom position.

First Embodiment

A description will now be given of a first embodiment according to the present invention. The following problems occur in an attempt to display the index of the distance information without considering a difference in specification (performance and method) of the interchangeable lens 100, such as a wide-angle lens and a telephoto lens, and a difference in specification of the display unit 204 of the camera body 200, such as the number of pixels.

Figure 4:
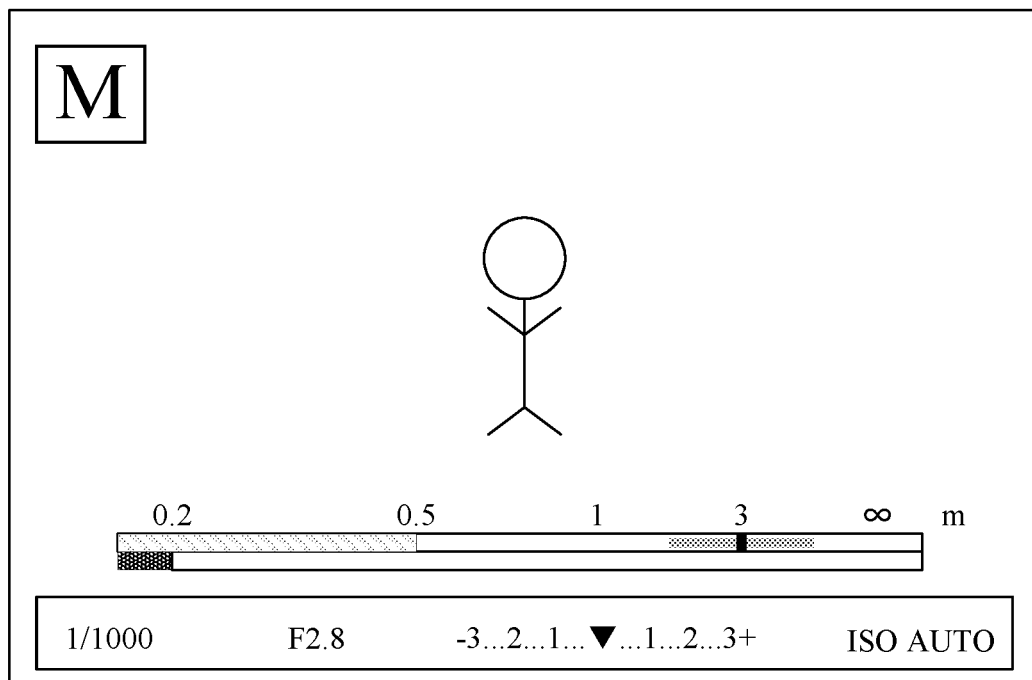
FIG. 4 illustrates a distance display bar displayed on a display unit of a camera body.

FIG. 4 illustrates the distance information (distance display bar) displayed on the display unit 204 of the camera body 200. In addition to the distance information, the display unit 204 displays the video signal obtained by the signal processing circuit 202 that performs various image processing for the signal that is obtained by the image sensor 201 as a result of photoelectrically converting the image formed by the interchangeable lens 100. The display unit 204 further displays a camera mode, a shutter speed, an aperture value (F-number), an exposure compensation, an ISO speed, and the like, which are set values of the camera body 200.

In order to realize the distance display illustrated in FIG. 4, the lens microcomputer 111 transmits to the camera microcomputer 206 information of "0.2 m," "0.5 m," "1 m," "3 m," and "∞" as the representative indexes of the distance information. It is necessary to transmit the position where each representative index is displayed at the same time. Assume that the left end of the distance display bar is a display start position and a command is issued in image resolution unit, such as "100 pixels," from the display start position. Then, the lens microcomputer 111 needs to previously recognize the overall length of the distance display bar.

Figure 5A:
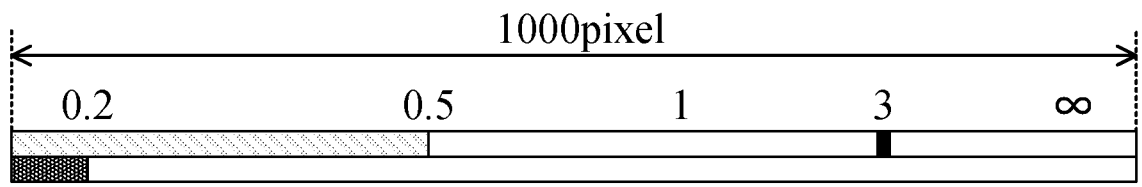
FIGS. 5A and 5B illustrate a display position of the distance display bar designated in pixel unit.
Figure 5B:
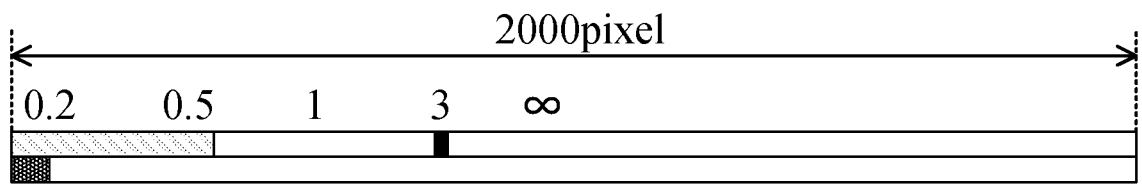

FIGS. 5A and 5B illustrate the display position of the distance display bar designated in pixel unit. For example, assume that the lens microcomputer 111 does not recognize the overall length of the distance display bar and communicates the same information as described above when the number of effective pixels of the display unit 204 of the camera body 200 increases. Although the display illustrated in FIG. 5A is attempted, the display is compressed as illustrated in FIG. 5B, and the distance information cannot be accurately displayed. Accordingly, the lens microcomputer 111 needs to acquire the overall length (number of pixels) of the distance display bar from the camera microcomputer 206, to calculate information of the representative index position based on the acquired overall length (number of pixels) of the distance display bar, and to send it to the camera microcomputer 206. When the items to be displayed on the display unit 204 of the camera body 200 cover not only the representative indexes but also the lens driving range and limit range, the interchangeable lens 100 needs to perform calculation processing so as not to negatively affect driving controls, such as focusing, diaphragm driving, and the image stabilization. In addition, any delays in communicating the display information may cause a display delay and harm the usability of the user. It is therefore necessary to suppress a communication amount of the display information and a processing load on each calculation.

Accordingly, in this embodiment, the lens microcomputer 111 transmits to the camera microcomputer 206 not only information suitable for the specification of the interchangeable lens 100 (first information), but also a normalized value (second information) as necessary. Thereby, information corresponding to the interchangeable lens 100 can be properly displayed on the display unit 204 of the camera body 200.

Figures 6, 7:
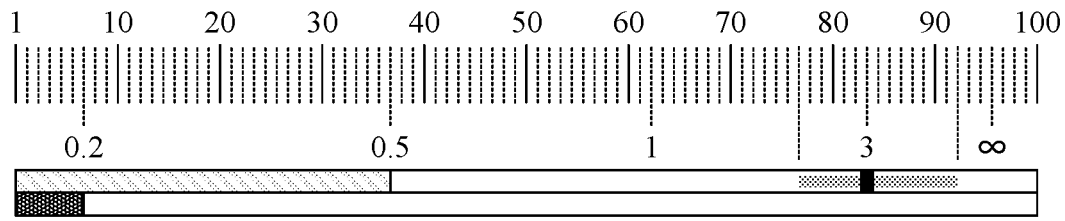
FIG. 6 illustrates an example of a distance display bar according to a first embodiment that is divided into 100.
FIG. 7 is an approximate expression used to calculate the depth of field according to the first embodiment.

Referring now to FIG. 6, a description will be given of the normalization. FIG. 6 illustrates an example of the distance display bar displayed on the display unit 204 of the camera body 200 and divided into 100. As illustrated in FIG. 6, when the entire distance display bar is equally divided, the left end is set to 1, and the right end is set to 100, "0.2 m" as one representative index is placed at a position "7." As other information, the representative index "0.5 m" is placed at a position "37," the representative index "1 m" is placed at a position "62," the representative index "3 m" is placed at a position "83," the representative index "∞" is placed at a position "96," the lens undrivable area covers up to the position "7," the limit area covers up to the position "37," and the lens position is placed at a position "83." The lens microcomputer 111 transmits this information (arrangement information) to the camera microcomputer 206. This information includes normalized values from 1 to 100 made by the lens microcomputer 111 based on various information such as distance information held by the interchangeable lens 100. The camera microcomputer 206 displays the distance information on the display unit 204 based on the information received from the lens microcomputer 111.

Referring now to FIG. 7, a description will be given of the depth of field. FIG. 7 shows an expression (approximate expression) used to calculate the depth of field. The depth of field is a distance at which an image appears to be in focus. The depth of field is calculated by the camera microcomputer 206 using the expression illustrated in FIG. 7. Information that serves as a reference for whether or not the object is in focus (third information), that is, information on a diameter δ of a permissible circle of confusion and information on a set aperture value F (F-number at the time of imaging) is stored in a memory (such as the internal memory of the camera microcomputer 206) in the camera body 200.

On the other hand, information on the focal length f and information on the object distance L (first information) are different according to the position of the focus lens 105 or the zoom lens 102, and stored in the memory of the interchangeable lens 100 (such as the internal memory of the lens microcomputer 111). Therefore, the camera body 200 needs to receive this information from the interchangeable lens 100 through communications. The camera body 200 calculates the depth of field based on this information, and the depth of field calculated herein is the absolute distance of the depth of field. Since the camera body 200 displays the normalized information (second information) transmitted from the interchangeable lens 100 as it is on the display unit 204, it is necessary to normalize and display the absolute distance information. The normalization calculation is performed by the interchangeable lens 100. Therefore, the camera body 200 receives the second information (coefficients of approximate expression (polynomial approximation), etc.) for normalizing the depth of field of the absolute distance from the interchangeable lens 100 through communications, performs the normalization calculation of the depth of field, and displays it on the display unit 204. The second information is, for example, a coefficient of an approximate expression (polynomial approximation or the like) used to normalize the distance information of the in-focus range calculated using the first information in order to display it on the display unit 204.

The first information is not limited to the object distance (distance from the front principal point position to the object (object plane)), but may be the image taking distance (distance from the image plane to the object). That is, the first information may include at least one of the focal length, the image taking distance, the object distance, and the front principal point position.

Figure 8:
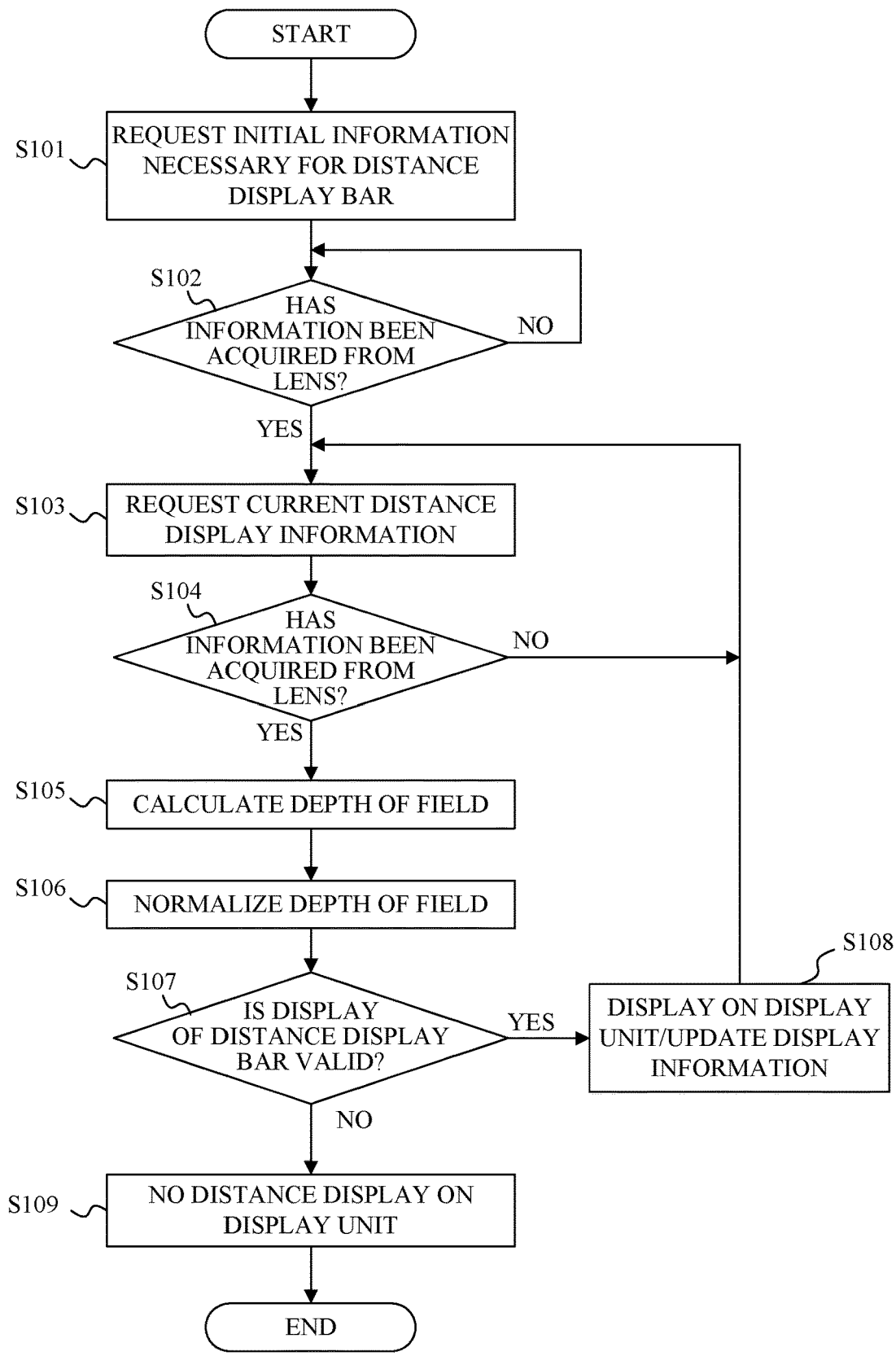
FIG. 8 is a flowchart showing display processing of the depth of field according to the first embodiment.

Referring now to FIG. 8, a description will be given of processing of displaying the depth of field on the display unit 204 of the camera body 200. FIG. 8 is a flowchart showing the display processing of the depth of field.

First, in the step S101, the camera microcomputer 206 of the camera body 200 requests the lens microcomputer 111 of the interchangeable lens 100 for the initial information necessary for the distance display bar. The initial information is information that does not change depending on the state of the interchangeable lens 100, and includes the values of the representative indexes, the positions of the representative indexes, the information necessary for the normalization, and the like. Next, in the step S102, the camera microcomputer 206 determines whether or not the reception of the initial information requested in the step S101 has been completed. If the reception of the initial information has not yet been completed, the step S20 is repeated. On the other hand, if the reception of the initial information has been completed, the flow proceeds to the step S103.

In the step S103, the camera microcomputer 206 requests the interchangeable lens 100 for the current information (current distance display information) necessary to display the distance display bar. The current information is information that changes depending on the state of the interchangeable lens 100, and includes information such as the lens undrivable area, the limit area, the lens position, the focal length, and the object distance. This information is, for example, information that changes depending on the position of the zoom lens 102 and the position of the focus lens 105. Next, in the step S104, the camera microcomputer 206 determines whether or not the reception of the current distance display information requested in the step S103 has been completed. If the reception of the current distance display information has not yet been completed, the flow returns to the step S103. On the other hand, if the reception of the current distance display information has been completed, the flow proceeds to the step S105.

In the step S105, the camera microcomputer 206 calculates the depth of field based on the current distance display information received from the interchangeable lens 100 in the step S103 and the expression shown in FIG. 7. Next, in the step S106, the camera microcomputer 206 performs normalization processing (normalization processing of the depth of field) configured to display the depth of field calculated in the step S105 on the distance display bar of the display unit 204. As described above, the normalization calculation is performed based on the normalization information transmitted from the interchangeable lens 100.

Next, in the step S107, the camera microcomputer 206 determines whether or not the display of the distance display bar is valid. When the display of the distance display bar is valid, the camera microcomputer 206 displays the distance display bar on the display unit 204 (or updates the display information of the display unit 204 if it has already been displayed), and moves to the step S103. As described above, the camera microcomputer 206 periodically requests the interchangeable lens 100 for the information (first information) that changes according to the state of the interchangeable lens 100. The camera microcomputer 206 changes the display information of the display unit 204 based on the information received from the interchangeable lens 100. On the other hand, if the display of the distance display bar is invalid in the step S107, the flow proceeds to the step S109. In the step S109, the camera microcomputer 206 does not display the distance on the display unit 204.

As described above, this embodiment separates the processing performed by the interchangeable lens 100 and the processing performed by the camera body 200, and minimizes a communication amount. Thereby, this embodiment can display the depth of field on the display unit 204 of the camera body 200 without negatively affecting the drive control of the interchangeable lens 100, and improve the operability of the user.

Figure 9:
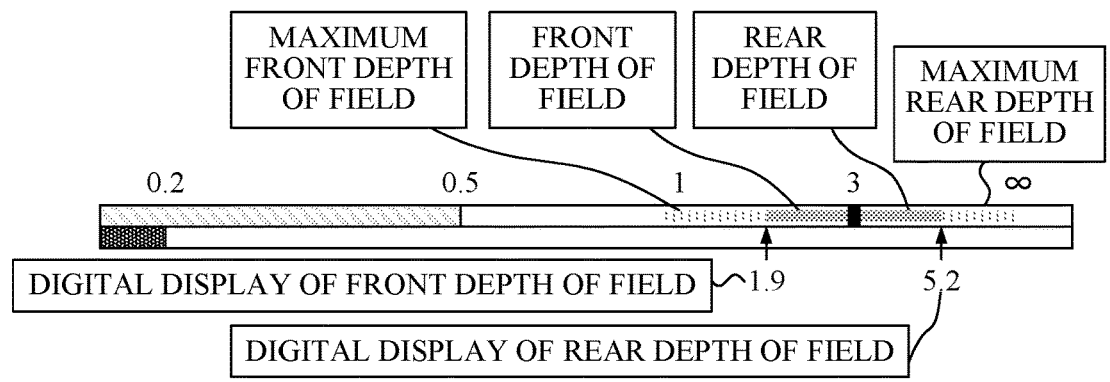
FIG. 9 illustrates an example of the depth of field superimposed on the distance display bar according to the first embodiment.

The information of the maximum F-number may be included in the initial information received in the step S101 or the current distance display information received in the step S103. In this case, as illustrated in FIG. 9, the maximum depth of field based on the maximum F-number settable by the interchangeable lens 100 can be displayed while superimposed on the distance display bar, for example, with a different color or pattern. The absolute value of the depth of field calculated in the step S105 may be digitally displayed on the distance display bar. The digitally displayed position can be calculated through the above normalization processing.

Second Embodiment

A description will now be given of a second embodiment according to the present invention. When the depth of field calculated in the step S105 in FIG. 8 is shallow, it is difficult to display the depth of field on the distance display bar with good visibility. As illustrated in FIG. 6, when the depth of field is smaller than "1" that is the minimum display unit of the distance display bar in the configuration that displays the distance display bar while dividing it into 100, it is difficult to display the depth of field, and even if the depth of field even having "1" is displayed, its visibility is poor. When the interchangeable lens 100 is, for example, a macro lens, it is assumed that imaging with a shallow depth of field is likely, the depth of field is not always displayed, and the user is hard to visually recognize the depth of field. Accordingly, this embodiment provides an enlarged display in which part of the distance display bar is enlarged and displayed. The enlarged display is display processing for improving the visibility by displaying the distance display bar that is partially enlarged, when the depth of field is too narrow to be displayed on the normal distance display bar, or when it cannot be displayed with good visibility due to the narrow width.

Figure 10:
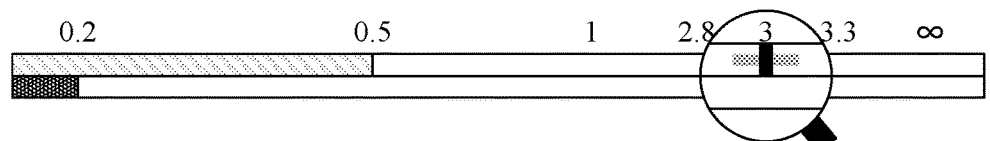
FIG. 10 illustrates an enlarged display example of part of a distance display bar according to a second embodiment.
Figure 11:
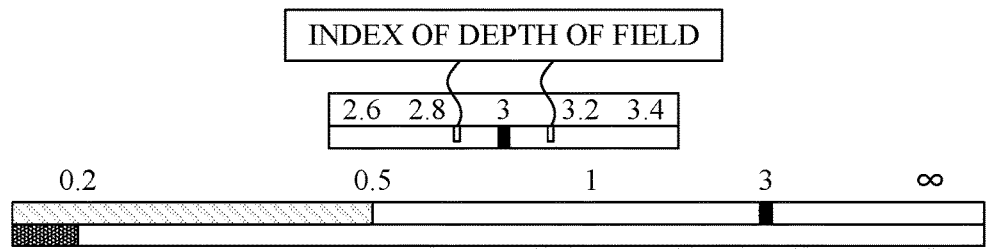
FIG. 11 illustrates another enlarged display example of part of the distance display bar according to a second embodiment.

FIGS. 10 and 11 illustrate examples of the distance display bar that is partially enlarged and displayed. FIG. 10 illustrates the example in which the lens position index currently placed at the position of 3 m is centered, and the close side is set to 2.8 m and the infinity side is set to 3.3 m. FIG. 11 illustrates an example in which a new display is added to the top of the distance display bar. The enlarged display unit displays an index indicating the depth of field to the left and right of the lens position index, so that the representative index value moves instead of moving the position of the lens position index.

The examples in FIGS. 10 and 11 need complementary processing in the enlarged display dimension, because the index width of the normalized depth of field is expressed in unit of 100 divisions of the entire distance display bar and unsuitable for display. For example, the first embodiment normalizes it into values from "1" to "100" in the normalization calculation, and displays it while truncating decimal points, but there is a method of using it as the index width of the enlarged display without truncations.

Figure 12:
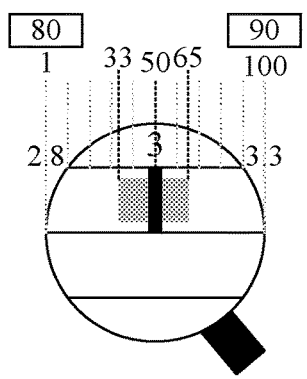
FIG. 12 illustrates an enlarged display example of the distance display bar according to the second embodiment that is divided into 100.

More specifically, in the enlarged display of a range from "80" to "90" in the overall index dimension, a gap between "80" and "90" is further divided into 100 as illustrated in FIG. 12. FIG. 12 illustrates an example of the distance display bar that is enlarged and displayed and divided into 100. When the front depth of field has a value of "83.3" and the rear depth of field has a value of "86.5" before the decimal point is truncated after the normalization calculation is made, a range from "33" to "65" in the enlarged display dimension is set to the depth of field. This method can properly display the depth of field even in the enlarged display.

The normalization information used to display the depth of field sent from the interchangeable lens 100 on the distance display bar is optimized for displaying the distance display bar while it is divided into 100, so that the depth of field in the enlarged display may not be accurately displayed. In that case, the camera body 200 can request the interchangeable lens 100 for information for displaying the depth of field in the enlarged display on the distance display bar, receive it, and make a calculation based on the information for the enlarged display received from the interchangeable lens 100.

Since the depth of field is often shallow during macro imaging, the camera body 200 may switch between turning on and off of the enlarged display depending on the position of the focus lens 105 in the interchangeable lens 100. Since the calculation method is often erroneous when the camera body 200 determines the macro imaging, the calculation method may be switched to a more accurate calculation method instead of using the approximate expression shown in FIG. 7. The method of expressing the depth of field in the enlarged display may use various modifications such as a method using various complementary calculations in the camera body 200, a method in which the interchangeable lens 100 has information for the enlarged display, and a method using a combination thereof.

Figure 13A:
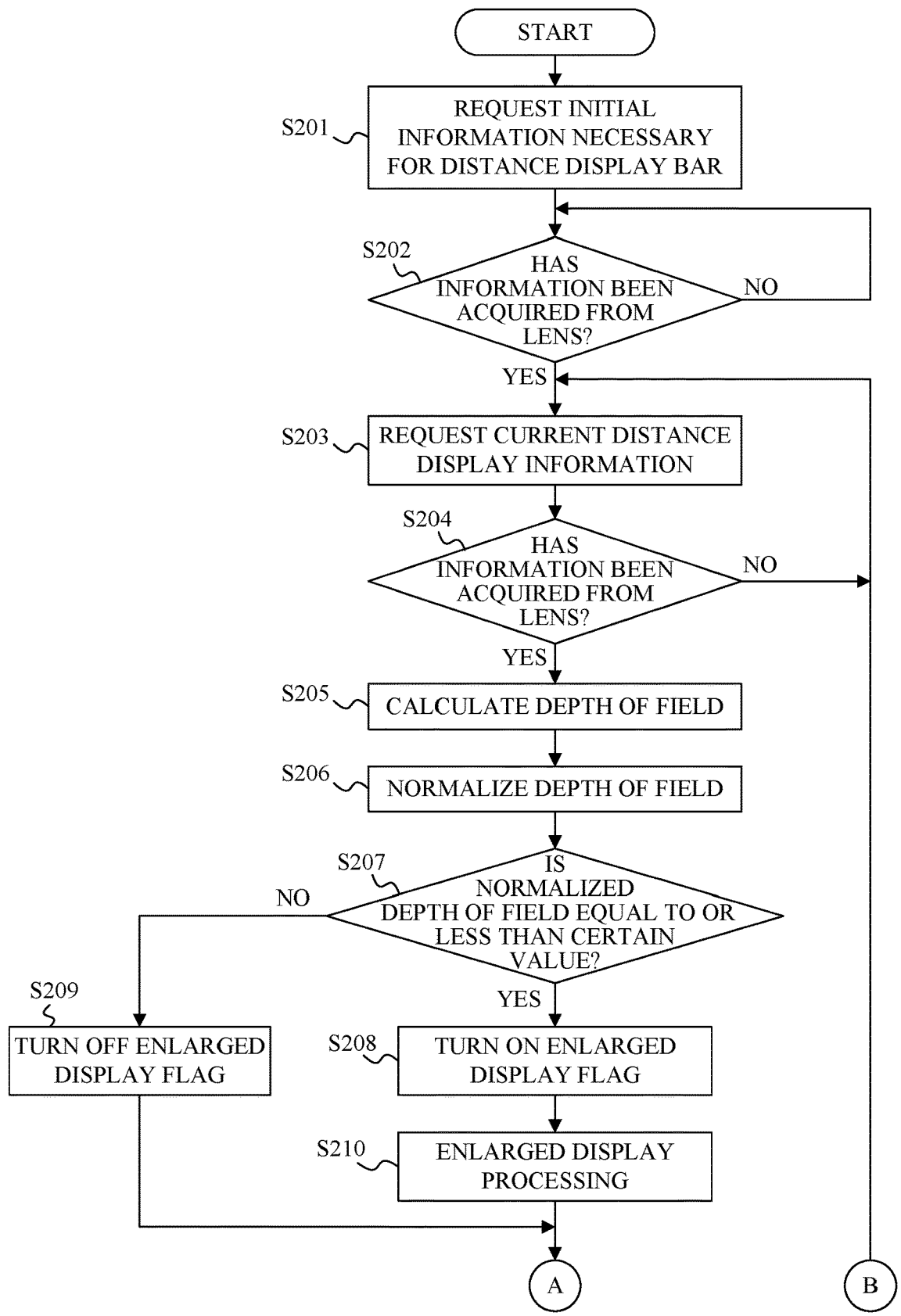
FIGS. 13A and 13B show a flowchart showing enlarged display processing of the distance display bar according to the second embodiment.
Figure 13B:
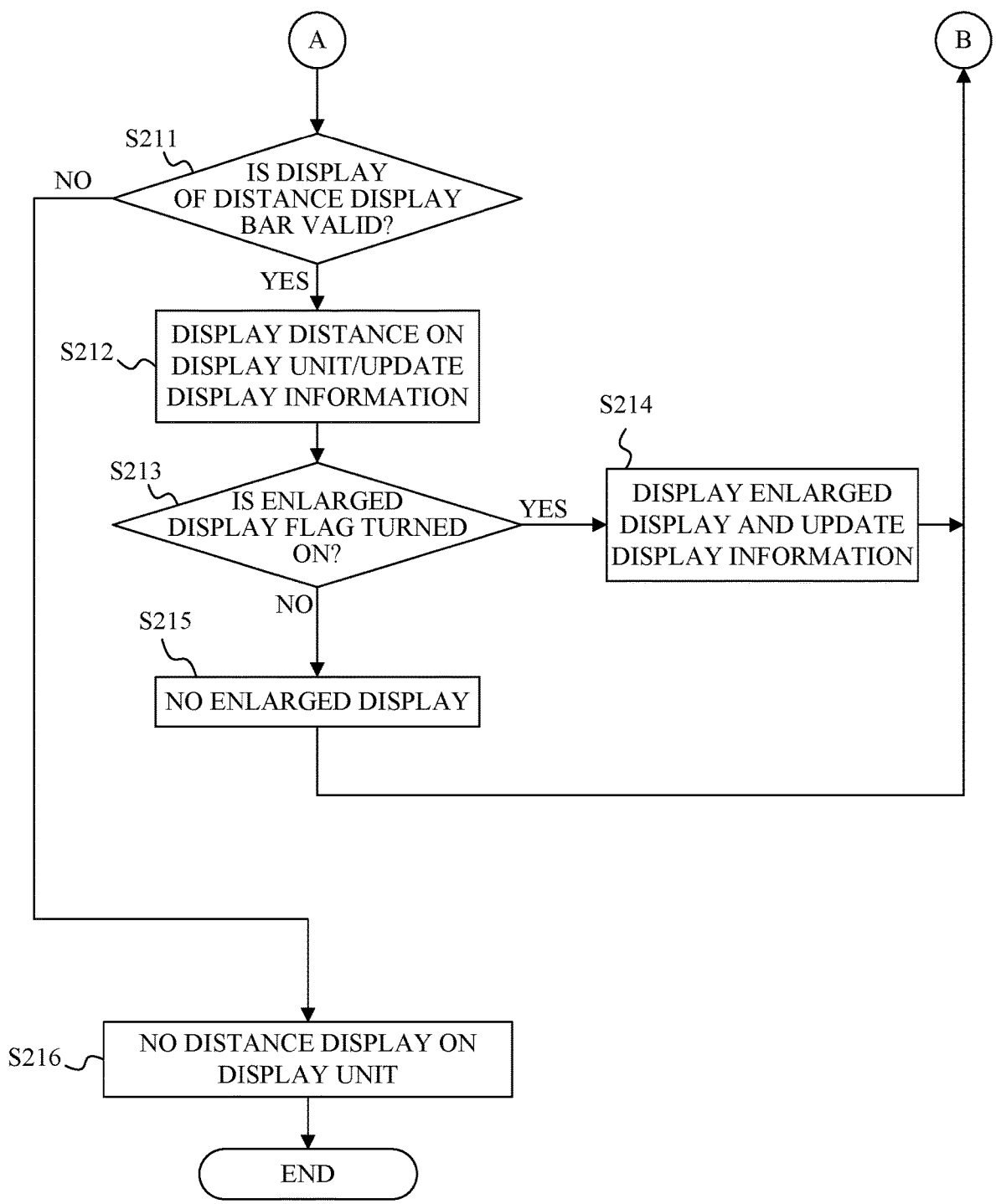

Referring now to FIGS. 13A and 13B, a description will be given of the enlarged display processing of the distance display bar in this embodiment. FIGS. 13A and 13B show a flowchart of the enlarged display processing of the distance display bar. Since the steps S201 to S206 in FIG. 13A are the same as the steps S101 to S106 in FIG. 8, a description thereof will be omitted.

In the step S207, the camera microcomputer 206 determines whether or not the normalized depth of field calculated in the step S206 is equal to or less than a certain value (or a predetermined value). If the normalized depth of field is equal to or less than the predetermined value, the flow proceeds to the step S208. In the step S208, the camera microcomputer 206 turns on an enlarged display flag. Next, in the step S210, the camera microcomputer 206 performs the enlarged display processing. If necessary, the camera microcomputer 206 requests the interchangeable lens 100 for the information for the enlarged display, and performs a calculation relating to the enlarged display based on the information transmitted from the interchangeable lens 100. When the camera microcomputer 206 completes the enlarged display processing, the flow proceeds to the step S211.

On the other hand, if the normalized depth of field in the step S207 is larger than the predetermined value, the flow proceeds to the step S209. In the step S209, the camera microcomputer 206 turns off the enlarged display flag and moves to the step S211.

In the step S211 the camera microcomputer 206 determines whether or not the display of the distance display bar is valid. If the display of the distance display bar is valid, the flow proceeds to the step S212. In the step S212, the camera microcomputer 206 displays the distance display bar on the display unit 204, and updates the display information if it has already been displayed. Next, in the step S213, the camera microcomputer 206 determines whether or not the enlarged display flag is turned on. If the enlarged display flag is turned on, the flow proceeds to the step S214. On the other hand, when the enlarged display flag is turned off, the flow proceeds to the step S215.

In the step S214, the camera microcomputer 206 displays the enlarged display unit, and updates the display information of the enlarged display unit if it has already been displayed. Similar to the first embodiment, the camera microcomputer 206 periodically requests the interchangeable lens 100 for information (first information) that changes depending on the state of the interchangeable lens 100, and periodically changes the display information of the display unit 204 based on the received information. In the step S215, the camera microcomputer 206 does not display the enlarged display unit.

If the display of the distance display bar is invalid in the step S211, the flow proceeds to the step S216. In the step S216, the camera microcomputer 206 does not display the distance.

In this embodiment, the second information changes according to the display width of the display unit 204 (or according to the enlarged display). When the depth of field is smaller than a predetermined value, the camera microcomputer 206 may switch the display format (or method) in the display unit 204 (to the enlarged display). The camera microcomputer 206 may switch the display format (to the enlarged display) when the position of the focus lens 105 is closer to the close end (short distant end or near end) than the predetermined position (or in the case of the macro imaging). When the position of the focus lens 105 is closer to the close end than the predetermined position, the camera microcomputer 206 may switch the calculation method (approximate expression) of the depth of field (or in the case of the macro imaging).

Even when the width of the depth of field displayed on the distance display bar is narrow, this embodiment can improve the visibility of the user through the enlarged display.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

As described above, in each embodiment, the lens apparatus (interchangeable lens 100) includes the communicator (lens microcomputer 111). The communicator transmits to the image pickup apparatus the first information used to calculate the depth of field and the second information used to normalize the depth of field into the display format of the display unit 204 of the image pickup apparatus (camera body 200). The image pickup apparatus includes the calculator (camera microcomputer 206) and the display unit 204. The calculator calculates the depth of field based on the first information transmitted from the lens apparatus and the stored information stored in the image pickup apparatus. The display unit 204 normalizes the depth of field and displays information on the depth of field based on the second information transmitted from the lens apparatus.

Each embodiment provides a lens apparatus, an image pickup apparatus, a control method of the lens apparatus, a control method of the image pickup apparatus, and a storage medium, each of which can display information on the depth of field on the display unit of the camera body and improve the operability of the user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-189241, filed on Nov. 13, 2020, which is hereby incorporated by reference herein in its entirety.

What is claimed is:

1. A lens apparatus attachable to an image pickup apparatus, the lens apparatus comprising:
an imaging optical system; and
a lens controller including:
a communicator configured to, in a state where the lens apparatus is attached to the image pickup apparatus, transmit to the image pickup apparatus (i) depth-of-field information including (i.a) first information configured to allow the image pickup apparatus to calculate an absolute distance of a depth of field and (i.b) second information configured to allow the image pickup apparatus to calculate a normalized depth of field by normalizing the calculated absolute distance of the depth of field into a display format of a display unit of the image pickup apparatus so as to allow the image pickup apparatus to display the calculated normalized depth of field together with a distance display bar on the display unit of the image pickup apparatus, and
a calculator configured to calculate the second information to be sent to the image pickup apparatus by the communicator, the calculated second information including a coefficient of an approximate expression used to normalize the calculated absolute distance of the depth of field in an in-focus range calculated with the first information so as to display the calculated normalized depth of field on the display unit.

2. The lens apparatus according to claim 1, wherein the first information includes at least one of a focal length, an image taking distance, an object distance, and a front principal point position.

3. The lens apparatus according to claim 1, wherein the communicator of the lens apparatus is configured to receive, from the image pickup apparatus, periodic requests for the first information.

4. The lens apparatus according to claim 1, wherein the first information is different according to a position of a focus lens or a zoom lens in the imaging optical system.

5. The lens apparatus according to claim 1, wherein the second information changes according to a display width of the display unit.

6. The lens apparatus according to claim 1, wherein the communicator of the lens apparatus is further configured to transmit, to the image pickup apparatus, (ii) arrangement information including normalized values configured to allow the image pickup apparatus to display the distance display bar together with the calculated normalized depth of field on the display unit of the image pickup apparatus.

7. The lens apparatus according to claim 1, wherein the communicator of the lens apparatus is further configured to (ii) receive a request from the image pickup apparatus, in a case where the calculated normalized depth of field is equal to or less than a predetermined value, for third information configured to allow the image pickup apparatus to display the calculated normalized depth of field in an enlarged manner, and to (iii) transmit to the image pickup apparatus the third information configured to allow the image pickup apparatus to display the calculated normalized depth of field in the enlarged manner in response to the request.

8. The lens apparatus according to claim 1, wherein the communicator of the lens apparatus is further configured to transmit to the image pickup apparatus third information configured to allow the image pickup apparatus to display the calculated normalized depth of field in an enlarged manner.

9. A control method of a lens apparatus attachable to an image pickup apparatus and configured to send first information and second information to the image pickup apparatus, the control method comprising:
  calculating, by the lens apparatus, the second information;
  acquiring, in a state where the lens apparatus is attached to the image pickup apparatus, (i) depth of field information including (i.a) the first information, the first information being configured to allow the image pickup apparatus to calculate an absolute distance of a depth of field, and (i.b) the calculated second information, the calculated second information being configured to allow the image pickup apparatus to calculate a normalized depth of field by normalizing the calculated absolute distance of the depth of field into a display format of a display unit of the image pickup apparatus so as to allow the image pickup apparatus to display the calculated normalized depth of field together with a distance display bar on the display unit of the image pickup apparatus, and the calculated second information including a coefficient of an approximate expression used to normalize the calculated absolute distance of the depth of field in an in-focus range calculated with the first information so as to display the calculated normalized depth of field on the display unit; and
  transmitting, in the state where the lens apparatus is attached to the image pickup apparatus, the first information and the calculated second information to the image pickup apparatus.

10. A non-transitory storage medium configured to store a program that causes a computer in the lens apparatus to execute the control method of the lens apparatus according to claim 9.

* * * * *